G. C. RAEGER.
EXPANSION AND FASTENING DEVICE.
APPLICATION FILED APR. 27, 1915.
1,175,662.
Patented Mar. 14, 1916.
2 SHEETS—SHEET 1.
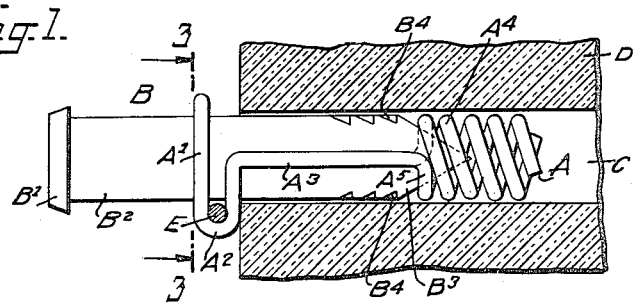
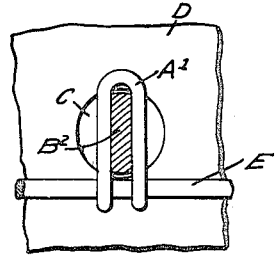
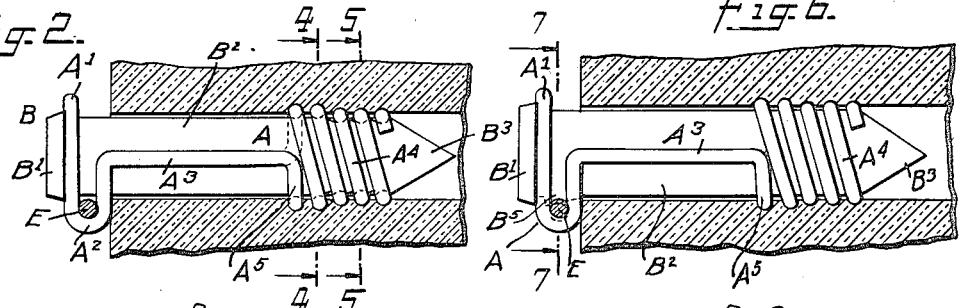
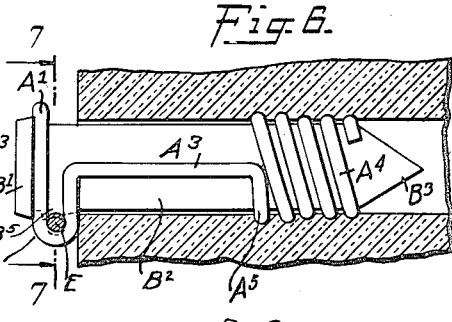
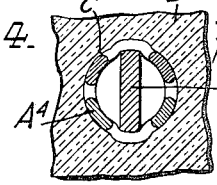
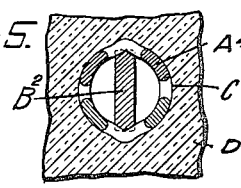
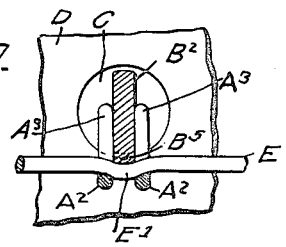
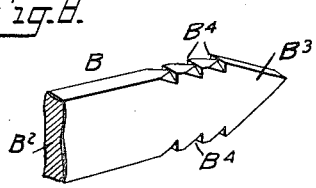
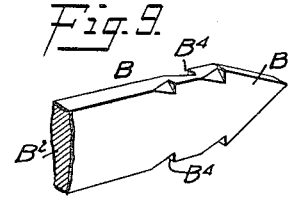
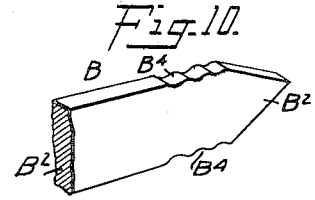
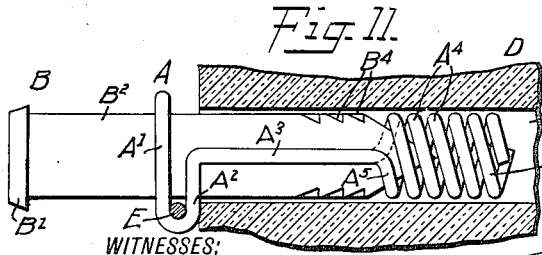
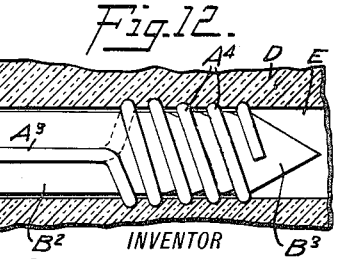
WITNESSES:
George L. Blume.
Theo. G. Hoster.
INVENTOR
George C. Raeger.
BY Munn & Co
ATTORNEY G. C. RAEGER.
EXPANSION AND FASTENING DEVICE.
APPLICATION FILED APR. 27, 1915.
1,175,662.
Patented Mar. 14, 1916.
2 SHEETS—SHEET 2.
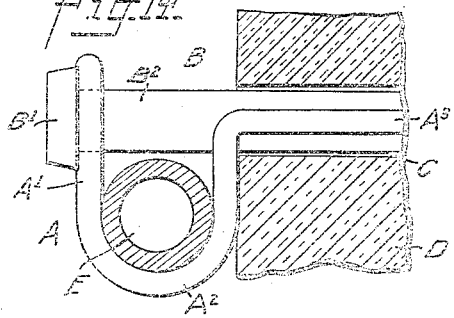
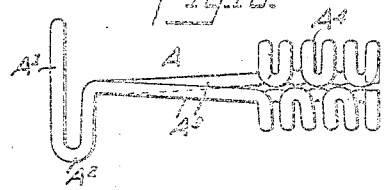
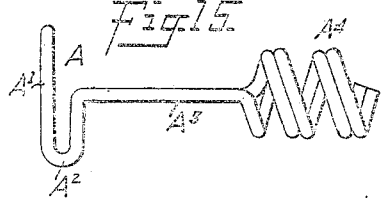
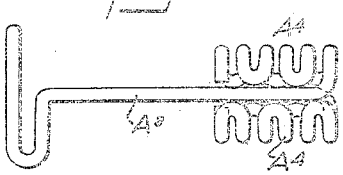
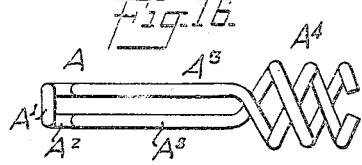
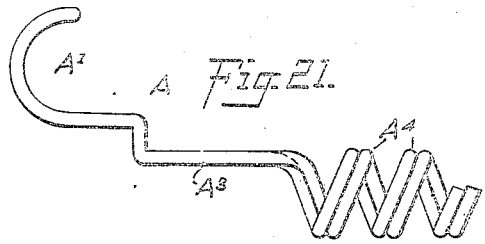
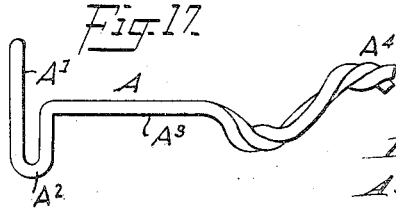
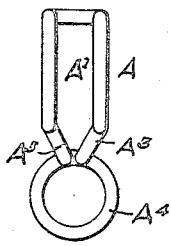
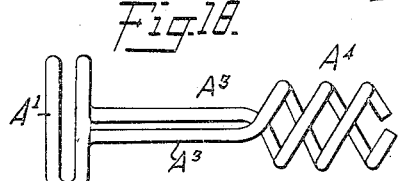
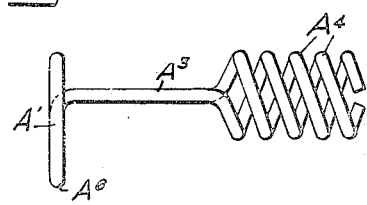
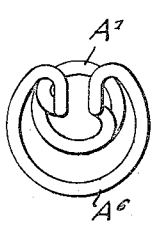
WITNESSES:
George L. Blume.
Hw. G. Hostr.
INVENTOR
George C. Raeger.
BY
ATTORNEY

UNITED STATES PATENT OFFICE.

GEORGE C. RAEGER, OF WATERLOO, NEW YORK.

EXPANSION AND FASTENING DEVICE.

1,175,662.   Specification of Letters Patent.   Patented Mar. 14, 1916.

Application filed April 27, 1915. Serial No. 24,344.

*To all whom it may concern:*

Be it known that I, GEORGE C. RAEGER, a citizen of the United States, and a resident of Waterloo, in the county of Seneca and State of New York, have invented a new and Improved Expansion and Fastening Device, of which the following is a full, clear, and exact description.

The invention relates to expansion and fastening devices, such as shown and described in the application for Letters Patent of the United States, No. 851,738, filed by me on July 18, 1914.

The object of the present invention is to provide a new and improved expansion and fastening device which is very simple and durable in construction, can be cheaply manufactured and is arranged for use in concrete walls, posts and other structures, to permit of conveniently locking the device in position in a hole in a structure and at the same time fastening a pipe, rod, wire or other article in place on the structure.

In order to accomplish the desired result, use is made of an expansible member adapted to be inserted in a hole of a structure and formed of wire bent to provide a head, a shank and an expansion coil, and a driving and locking member adapted to be driven into the said expansible member to expand the coil thereof in the hole.

A practical embodiment of the invention is represented in the accompanying drawings forming a part of this specification, in which similar characters of reference indicate corresponding parts in all the views.

Figure 1 is a side elevation of the expansion and fastening device in position in a hole of a structure, the latter and the article held in place on the structure being shown in section; Fig. 2 is a similar view of the same with the driving and locking member driven home and the coils expanded; Fig. 3 is a cross section of the same on the line 3—3 of Fig. 1; Fig. 4 is a similar view of the same on the line 4—4 of Fig. 2; Fig. 5 is a similar view of the same on the line 5—5 of Fig. 2; Fig. 6 is a side elevation of a modified form of the expansion and fastening device as applied, the structure and the article to be fastened to the structure being shown in section; Fig. 7 is a cross section of the same on the line 7—7 of Fig. 6; Figs. 8, 9 and 10 are perspective views of different forms of notches on the shank of the driving and locking member; Fig. 11 is a side elevation of another modified form of expansion and fastening device as applied, the structure and the article to be fastened to the structure being shown in section; Fig. 12 is a similar view of the same with the driving and locking member driven home; Fig. 13 is a perspective view of a modified form of the driving and locking member; Fig. 14 is a side elevation of the outer portion of the expansion and fastening device arranged for fastening a pipe to a structure and the structure being shown in section; Fig. 15 is a side elevation of a modified form of the expansible member; Fig. 16 is a plan view of another modified form of the expansible member; Figs. 17, 18, 19, 20 and 21 are side elevations of other modified forms of the expansible member; Fig. 22 is a front end view of the expansible member shown in Fig. 21; Fig. 23 is a side elevation of another modified form of the expansible member; Fig. 24 is a front end elevation of the same, and Fig. 25 is a rear end view of the expansible member shown in Fig. 17.

The expansion and fastening device consists essentially of two parts, namely, an expansible and supporting member A and a driving and locking member B. The expansible and supporting member A is adapted to be inserted into a hole C formed in a concrete or other structure D, as plainly shown in Figs. 1, 2, 6, 11, 12 and 14. The expansible and supporting member A is formed of a piece of wire bent into a head A' of inverted U shape with the ends terminating in seats $A^2$ for supporting a wire, pipe, rod or other article E to be fastened in place on the face of the structure D. The seats $A^2$ terminate in spaced shanks $A^3$ terminating in coils $A^4$ of an exterior diameter corresponding approximately to that of the hole C. The driving and locking member B consists of a head B' and a flat shank $B^2$ terminating in a point $B^3$. The shank $B^2$ is adapted to pass through the open head A' between the shanks $A^3$, and its pointed end $B^3$ is adapted to pass into the coils $A^4$ so that on driving the member B home, as shown in Figs. 2, 6 and 12, the coils $A^4$ are expanded and are embedded in the wall of the hole C. The shank B² is provided at its top and bottom edges with notches B⁴ into which pass the convolutions of the coils A⁴ at the time the driving and locking member is driven home, as will be readily understood by reference to Figs. 2, 6 and 12, to hold the driving and locking member against accidental outward movement. When the member B is driven home its head B' engages the head A' and tends to bend the same over the article E to be fastened in place so as to securely clamp the article in position in its seat A². It is understood that the seat A² of the head A' abuts against the outer face of the structure D to limit the inward movement of the expansible and supporting member A.

From the foregoing it will be seen that by the arrangement described the expansible and supporting member A when driven home expands the coils in the hole C and embeds the convolutions thereof in the wall of the hole, thus securely fastening the expansible and supporting member in position on the structure. It will also be noticed that the driving and locking member B when driven home is locked against accidental outward movement by the convolutions of the coils A⁴ engaging the notches B⁴. If, however, for any reason, the article E is to be removed from the structure, the driving and locking member B can be pried out by a suitable tool to allow removal of the article E from the seat A² and withdrawal of the member A from the hole C.

The beginning portion A⁵ of each coil A⁴ preferably extends in a plane at a right angle to the axis of the coils, as will be readily understood by reference to Figs. 1, 2 and 6. By this arrangement the driving and locking member B is not liable to be twisted when driven home as is the case, for instance, in the form shown in Figs. 11, and 12, in which the beginning portion A⁵ is not at a right angle to the axis of the coils but extends spirally, the same as the remaining convolutions of the coils.

In some cases it is desirable to permit movement of the article E in the direction of its length and in such cases the driving and locking member B is not driven home to such an extent as to clamp the article E in position by the head A'. If it is desired, however, to positively lock the article E in place then the shank B² of the driving and locking member is provided at its under side with a wedge B⁵ (see Figs. 6 and 7) to engage the article E and bend the portion E' thereof extending between the seats A².
Various forms may be given to the notches B⁴, as plainly shown in Figs. 8, 9 and 10, and hence I do not limit myself to any particular form of notch. The notches B⁴ are preferably arranged on the top and bottom edges of the shank B² to receive the opposite portions of the convolutions of the coils A⁴. The notches may be straight across at each edge, as shown in Fig. 8, or staggered, as shown in Fig. 9, or the notches may be of undulating form, as shown in Fig. 10 instead of in the shape of barbs, as shown in Figs. 1, 8, 9 and 13.

In case the expansible and supporting member A is made of very heavy wire, it is desirable to use a driving and locking member B, as shown in Fig. 13, which has its shank B² wider in the outer portion and reduced at the inner portion to reduce the amount of expansion of the coils A⁴ at the time the member B is driven home.

The coils A⁴ of the expansible member A may be of various shapes, as illustrated in the drawings, and hence I do not limit myself to any particular style of coil. As shown in Figs. 1, 2, 6, 11 and 12, the convolutions of the coils A⁴ are spaced in parallel relation to each other, but, as shown in Fig. 15, the convolutions of the two coils A⁴ from the shanks A³ are in contact with each other but the double convolutions are spaced apart. In Fig. 16, the convolutions of the two coils A⁴ extending from the shanks A³ cross each other, and, as shown in Fig. 17, the convolutions of the coils A⁴ are twisted together with an opening between the top and bottom twists. In the forms heretofore shown, the shanks A³ extend on opposite sides of the shank B² of the driving member B, but the shanks A³ may be both located on one side, as indicated in Fig. 18, it being understood that in this case the inner member of the seat A² of one side is continued upwardly and over to the other side to locate the shank for this member on the same side as the other shank. As shown in Fig. 19, the expansive ends of the member A are in the form of half coils disposed opposite each other for the point B³ of the driving member to pass between the half coils to expand the same in opposite directions. In Fig. 19, the half coils A⁴ begin at the terminals of the shanks A³ and extend inwardly. while in Fig. 20 the shanks A³ reach to the end of the member A and the half coils A⁴ extend from the terminals of the shanks A³ in a forward direction.

In the modified form shown in Figs. 21 and 22, the head A' of the expansible member A is in the form of a hook to snugly hold a pipe or other cylindrical article against a wall, it being understood that in this case the hook head assumes the function of the saddle A². The shanks A³ and the coils A⁴ may be of any one of the forms previously mentioned.

In the modified form shown in Figs. 23 and 24, the head A' is provided with an extra loop A⁶ to which an article may be attached instead of using the saddle A². It will be noticed that this extra loop A⁶ is in the same transverse plane as the remaining portions of the head to allow the head to lie flat against the face of the structure on which the expansion and fastening device is used.

By embedding the coils in the walls of the hole the device is securely held in place in the hole against any direct outward pull and very little of this stress is on the pin. The latter, however, due to its frictional contact and the notches or corrugations in engagement with the convolutions of the coils, is capable of resisting this stress to some extent, but the arrangement permits of withdrawing the pin with an effort such as is usually exerted on withdrawing an ordinary nail from wood, thus allowing removal or the article E whenever it is desired to do so.

Another feature of the device is that the lines of stress in concrete or other material, produced by expansion, are under control as to direction; being opposed in direction by turning the device one quarter way around they will be at right angles to former position. For instance, in a concrete post, the direction of the lines of stress are up and down and these lines of stress are parallel with the reinforcement which can best be resisted by the post, whereas a series of devices producing lateral stress tend to split the post.

Having thus described my invention, I claim as new and desire to secure by Letters Patent:

1. An expansion and fastening device, comprising an expansible member adapted to be inserted in a hole of a structure and formed of wire bent to provide a head, a shank and an expansion coil, and a driving and locking member adapted to be driven into the said expansible member to expand the coil thereof in the hole.

2. An expansion and fastening device, comprising an expansible member adapted to be inserted in a hole of a structure and formed of wire bent to provide a head, a shank and an expansion coil, and a driving and locking member adapted to be driven into the said expansible member to expand the coil thereof in the hole, the said driving and locking member having retaining means engaged by the said expansion coil to lock the said driving and locking member against withdrawal.

3. An expansion and fastening device, compromising an expansible member adapted to be inserted in a hole of a structure formed of wire bent to provide a head, a shank and an expansion coil, and a driving and locking member adapted to be driven into the said expansible member and provided with a wedge-shaped terminal adapted to engage and expand the coil in the hole, the driving and locking member having notches adjacent the terminal engaged by the coil members to hold the driving and locking member against withdrawal.

4. An expansion and fastening device, comprising an expansible member adapted to be inserted in a hole of a structure and formed of wire bent to provide a head, a shank and an expansion coil, the said head being adapted to abut against the face of the structure and the said shank having a seat for the article to be fastened in place, and a driving and locking member adapted to be driven into the said expansible member to expand the coil thereof in the hole.

5. An expansion and fastening device, comprising an expansible member adapted to be inserted in a hole of a structure and formed of wire bent to provide a head, a shank and an expansion coil, and a driving and locking member adapted to be driven into the said expansible member to expand the coil thereof in the hole, the said shank having a seat for the article to be held and the said driving and locking member having means adapted to coact with the said expansible member to clamp the article in position in the said seat.

6. An expansion and fastening device, comprising an expansible member adapted to be inserted in a hole of a structure and formed of wire bent to provide a head, a shank and an expansion coil, and a driving and locking member adapted to be driven into the said expansible member to expand the coil thereof in the hole, the said shank having adjacent its head a seat for the article to be fastened in place, and the said driving and locking member having a head adapted to engage and coact with the head of the expansible member to clamp the article in position in its seat.

7. An expansion and fastening device, comprising an expansible member and a driving and locking member, the said expansible member being adapted to be inserted in a hole in a structure and being made of wire bent to form an open head, and spaced shanks extending from the head and terminating in coils, the said driving and locking member being adapted to be driven through the open head and between the shanks, the inner end of the said driving and locking member being pointed to pass into the coils and expand the same.

8. An expansion and fastening device, comprising an expansible member and a driving and locking member, the said expansible member being adapted to be inserted in a hole in a structure and being made of wire bent to form an open head, and spaced shanks extending from the head and terminating in coils, the said driving and locking member being adapted to be driven through the open head and between the shanks, the inner end of the said driving and locking member being pointed to pass into the coils and expand the same, the shank being provided with notches adjacent the pointed end for engagement by the convolutions of the coils.

9. An expansion and fastening device, comprising an expansible member and a driving and locking member, the said expansible member being adapted to be inserted in a hole of a structure and being made of wire bent to form an open head, and spaced shanks extending from the head and terminating in coils, the head forming with the shanks a double seat for the article to be fastened to the structure, and the said driving and locking member being adapted to be driven through the open head and between the shanks, the inner end of the said driving and locking member being pointed to pass into the coils and expand the same.

10. An expansion and fastening device, comprising an expansible member and a driving and locking member, the said expansible member being adapted to be inserted in a hole in a structure and being made of wire bent to form an open head, and spaced shanks extending from the head and terminating in coils, the beginning portions of the coils being approximately at a right angle to the axis of the coils, and the said driving and locking member being adapted to be driven through the open head and between the shanks, the inner end of the said driving and locking member being pointed to pass into the coils and expand the same, the shank being provided with notches adjacent the pointed end for engagement by the convolutions of the coils.

11. An expansion and fastening device, comprising an expansible member and a driving and locking member, the said expansible member being adapted to be inserted in a hole in a structure and being made of wire bent to form an open head, and spaced shanks extending from the head and terminating in coils, the said driving and locking member consisting of a flat shank having a head at the outer end and being pointed at the other end, the shank having notches at its edges adjacent the pointed end, and the shank of the said driving and locking member being adapted to be driven through the said open head and between the shanks of the expansible member, the pointed end of the shank of the driving and locking member being adapted to pass into the said coils and expand the same, the convolutions of the coils being adapted to engage the said notches.

12. An expansion and fastening device, comprising an expansible member adapted to be inserted in a hole of a structure and formed of wire bent to provide a head, a shank and an expansible and gripping portion, and a driving and locking member adapted to be driven into the said expansible member to expand the said expansible and gripping portion.

In testimony whereof I have signed my name to this specification in the presence of two subscribing witnesses.

GEORGE C. RAEGER.

Witnesses:
CHARLES A. BUCKNAR,
CHAS. J. MCGRAW.

Copies of this patent may be obtained for five cents each, by addressing the "Commissioner of Patents, Washington, D. C."